United States Patent [19]
Paul

[11] Patent Number: 5,561,961
[45] Date of Patent: Oct. 8, 1996

[54] MOLDING MADE OF A POLYMERIC MATERIAL, INTENDED TO BE ATTACHED VIA CLIPPING OVER THE HEAD OF RIGID STUDS, NOTABLY OF AUTOMOBILE BODIES

[75] Inventor: Jean-Claude Paul, Perrier Sur Andelle, France

[73] Assignee: Establissements Mesnel, Nanterre, France

[21] Appl. No.: 372,285

[22] Filed: Jan. 13, 1995

[30] Foreign Application Priority Data

Jan. 14, 1994 [FR] France .................................. 94 00375

[51] Int. Cl.$^6$ ................................................ E04C 2/38
[52] U.S. Cl. .................. 52/716.7; 52/717.05; 52/718.02; 52/718.03; 52/716.1; 52/718.06
[58] Field of Search ............................ 52/716.7, 718.05, 52/718.06, 718.02, 718.03, 717.05, 717.04

[56] References Cited

U.S. PATENT DOCUMENTS

| | | | |
|---|---|---|---|
| 3,811,989 | 5/1974 | Hearn . | |
| 3,843,475 | 10/1974 | Kent | 52/716.7 X |
| 4,196,552 | 4/1980 | Bartlett | 52/718.05 X |
| 4,363,839 | 12/1982 | Watanabe et al. | 52/716.7 X |
| 4,399,644 | 8/1983 | Bright | 52/718.05 X |
| 4,651,490 | 3/1987 | Marston | 52/718.05 X |
| 4,869,937 | 9/1989 | Nagata et al. | 52/716.7 X |

FOREIGN PATENT DOCUMENTS

| | | | |
|---|---|---|---|
| 2365715 | 4/1978 | France | 52/716.07 |
| 3125808 | 3/1982 | Germany . | |
| 2210625 | 6/1989 | United Kingdom . | |
| 8908569 | 9/1989 | WIPO . | |

*Primary Examiner*—Carl D. Friedman
*Assistant Examiner*—W. Glenn Edwards
*Attorney, Agent, or Firm*—Cumpston & Shaw

[57] ABSTRACT

Novel molding made of a polymeric material, intended to be attached via clipping over the head of rigid studs, notably of automobile bodies.

The present invention relates to a molding made of at least one polymeric material, intended to be attached via clipping over the head [3] of rigid studs [4] having a T-shape cross section, in particular studs protruding from the surface of an automobile body.

According to the invention, the molding comprises:
  a body made of first thermoplastic polymeric material, this body having a C-shape cross section and being intended to cover the head of the studs, with the concave portion of the C turned towards the studs, and
  contiguous with each of the ends of the edges of the body having a C-shape cross section and intended to protrude in opposite directions under the concave portion of the C, in order to be engaged under the head of the stud, two hard lips made of a second thermoplastic material with a hardness higher than that of the first,
  the body and the two hard lips resulting from a single co-extrusion operation.

18 Claims, 2 Drawing Sheets

MOLDING MADE OF A POLYMERIC MATERIAL, INTENDED TO BE ATTACHED VIA CLIPPING OVER THE HEAD OF RIGID STUDS, NOTABLY OF AUTOMOBILE BODIES

FIELD OF THE INVENTION

The present invention relates to a novel molding made of a polymeric material, intended to be attached via clipping over the head of rigid studs, notably of automobile bodies.

BACKGROUND OF THE INVENTION

Numerous types of moldings intended to be attached to an automobile body, notably via clipping over the heads of rigid studs protruding from the surface of this body, exist. Such moldings are used, in particular, for automobile underbody weather seal joints or for dirt deflecting joints. They am generally produced by extrusion or co-extrusion of one or several thermoplastic materials and they can contingently comprise an imbedded metal reinforcement in one of the of the extruded materials.

The known moldings of this type are generally made of a relatively hard material, permitting clipping, under pressure, over the head of rigid studs having a T-shape cross section, provided for this purpose on the surface of the automobile body, on the head of which they are attached.

In its French Application for Patent 93 00219, of Jan. 13, 1993, the applicant proposed moldings for this purpose, in which the body of the molding is made of a relatively flexible polymeric material, an elastomer for example, whereas the portions intended to be engaged via clipping under the head of the studs are made of a harder polymeric material, for example of a polyolefin base, cross-linked or not, and are co-extruded with the body of the molding.

The moldings described in this previous application comprise:

a body made of a first polymeric material, this body including two tubular portions intended to be fitted on both sides of the studs, these tubular portions being connected by a portion forming a bridge, intended to be fitted over the heads of the studs, and each contiguous with a flexible wall of one of the tubular portions and protruding with respect to the latter under the bridge-forming portion, in a position such that they may be clipped under the head of the studs, two lips made of the second polymeric material having a hardness higher than that of the first material, the body and the two lips resulting from a single co-extrusion operation.

Because the lips intended to be clipped are contiguous with a flexible wall of a tubular portion, these walls can be deformed laterally, when placing the molding over the studs, or be separated from each other, to then return to their initial position via elasticity.

The present invention relates to setting forth moldings derived from those for which the characteristics have just been described, but which no longer comprise tubular portions and are therefore easier to produce than the latter.

The invention also has the aim of setting forth moldings derived from those described above but which, because of the absence of the tubular portions, are not fitted on the studs by deformation of a flexible wall of these portions, but by exerting pressure on a bridge-forming portion placed above the heads of the studs.

BRIEF DESCRIPTION OF THE INVENTION

To this end, the invention has as its aim a molding made of at least one polymeric material, intended to be attached via clipping over the head of rigid studs having a T-shape cross section, in particular studs protruding from the surface of an automobile body, this molding being characterized in that it is comprised of:

on one hand, a body made of first thermoplastic polymeric material, this body having a C-shape cross section and being intended to cover the head of the studs, with the concave portion of the C turned towards the studs, and on the other hand, contiguous with each of the ends of the edges of the body having a C-shape cross section and intended to protrude in opposite directions under the concave portion of the C, in order to be engaged under the head of the stud, two hard lips made of a second thermoplastic material with a hardness higher than that of the first, the body and the two hard lips resulting from a single co-extrusion operation.

Fitting the molding in place is effected by placing it above the studs with its concave surface turned towards the latter, and by exerting a pressure on the molding in the direction of the studs, so as to separate the edges of the body having a C-shape cross section and the contiguous lips from each other, so as to be able to freely bring the body in contact with the head of the studs. By relieving the pressure exerted, the edges of the body having a C-shape cross section will return to their initial position by drawing closer to each other and the hard lips of the molding thus will proceed to be engaged under the head of the studs, while rendering the molding solidly affixed to the latter.

The body of the molding can be, for example, made of rubber, notably of EPDM, with a SHORE A hardness located between 50 and 80, the hardness capable of being different in different locations of the same cross section, as a function of the effect desired.

The lips proceeding to clip over the head of the studs will be made of a harder material, with a hardness at least equal to a SHORE D of 50.

Naturally, these lips will have to be made of a material compatible with that constituting the body of the molding. They can be, for example, made of polyethylene, polypropylene, polyamide or polyurethane, solely or in various compatible mixtures and/or with other thermoplastic materials. Notably, the material marketed under the name HYTREL (registered brand), by the Dupont de Nemours Company, can be mentioned.

A metal reinforcement can be imbedded in the body of the molding to reinforce its rigidity, but, if tile material from which this body is constituted is sufficiently rigid, it is possible to avoid using such a reinforcement.

Preferably, at least one flexible lip will protrude from the surface of the portion of the body intended to be turned towards the head of the studs, so as to be compressed between this surface and the head of the studs, after fitting the molding over the latter, and thus avoid direct contact between the heads and the body of the molding.

As indicated above, such a molding can comprise on its external portion various sealing or decorative components, according to the role for which it is designed.

BRIEF DESCRIPTION OF THE DRAWING

One embodiment of such a molding will be described below in detail, by way of a non-limiting example, with reference to the accompanying drawings. On these drawings.

DETAILED DESCRIPTION OF THE PREFERRED EMBODIMENT

As is seen in these drawings, in this embodiment, the molding comprises a body [1], made of rubber, which exhibits a plane of symmetry. This body [1] exhibits a C-shape cross section, and a metal reinforcement [2], for example made of aluminum or steel, is imbedded in the rubber of the body [1].

Figure 1:
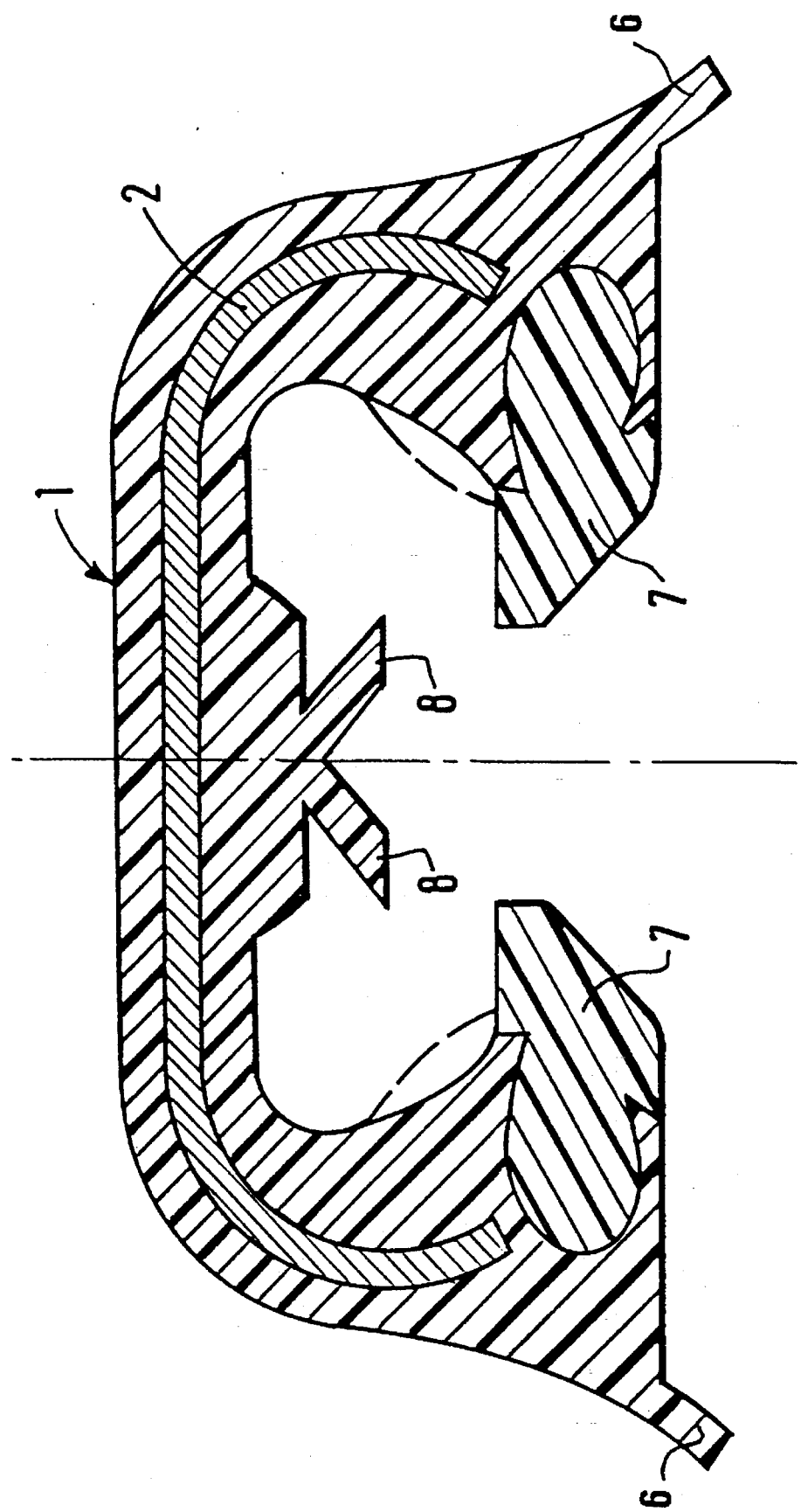
FIG. 1 is a cross-sectional cut of the molding.
Figure 2:
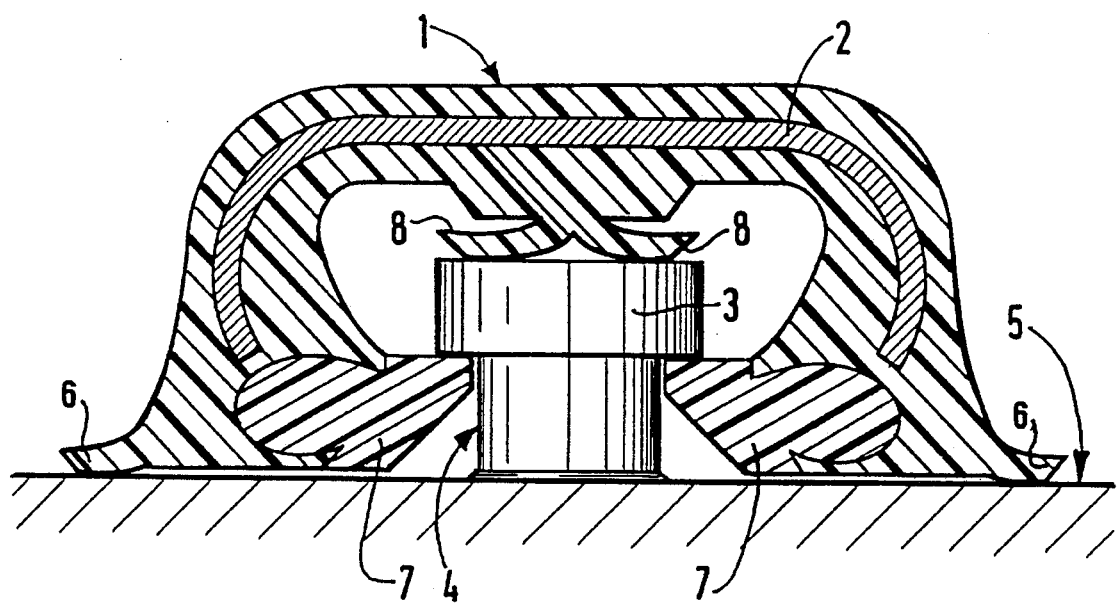
FIG. 2 is a sectional view illustrating the position of the molding on the bolts attached to the external surface of an automobile body.

As represented in FIG. 2, this molding is intended to be attached via clipping over the head [3] of studs [4] having a T-shape cross section, protruding from the surface of an automobile body [5], to which they are attached, the body [1] pressing against the body via flat surfaces and lateral lips [6].

For this purpose, two hard lips [7], made of a thermoplastic material harder than the rubber from which the body [1] is constituted, are contiguous with the lateral edges of the body of the molding having a C-shape cross section and protrude in opposite directions under the central portion of the C-shape body, in a position such that they might proceed to clip under the head [3] of the studs [4], with a flat surface applied against the lower flat surface of the head of the studs. These lips [7] are co-extruded with the body [1] of the molding.

As has been explained, to fit the molding over the studs [4], it is placed above the latter with its concave surface turned towards the head [3] of the studs, and a pressure is exerted on the molding in the direction of the head of the studs. Under this pressure, the lateral edges of the body [1] and the contiguous hard lips [7] separate from each other, and it is possible to bring the surface of the molding turned towards the heads of the studs in contact with the latter. By lessening the pressure exerted, the lateral edges of the body [1] and the lips [7] return to their initial position, and the lips [7] proceed to be positioned under the heads [3] thus locking, by automatically clipping, the molding on these lips.

In order to avoid direct contact and impact between the central portion of the body [1] and the head [3] of the studs [4], lips [8] protrude from the surface of the central portion of the body [1] and the head of the studs, in the direction of the latter, and after fitting the molding in place, these Nips [8] are compressed between the body [1] and the head of the studs [4], in the aim of avoiding any direct contact between the latter and dampen their relative movements. In addition, these lips [8] absorb vibrations and compensate for play and tolerances capable of existing.

It is clear that the molding in accordance with the invention can be easily produced, by co-extrusion of the body [1] and lips [7]. Of course, these lips can have another shape than that represented in the drawing.

This molding can be used in any applications in which moldings attached to car bodies are intended, notably lower body weather seal joints, roof joints and dirt deflecting joints.

I claim:

1. Molding made of at least one polymeric material, intended to be attached via clipping over the enlarged heads rigid studs having a T-shape cross section, in particular studs protruding from the surface of an automobile body, comprising:

an elongated body made of a first thermoplastic polymeric material, this body having a C-shape cross section and being intended to cover the head of the studs, with the concave portion of the C turned towards the studs, and two hard lips made of a second thermoplastic material with a hardness higher than that of the first, contiguous with each of the ends of the edges of the body having a C-shape cross section and intended to protrude in opposite directions under the concave portion of the C, in order to be engaged under the head of the stud.

the body and the two hard lips resulting from a single co-extrusion operation.

2. Molding according to claim 1, in which the body cComprises EPDM rubber, with a SHORE A hardness between 50 and 80.

3. Molding according to claim 1, in which the lips have a hardness at least equal to a SHORE D of 50.

4. Molding according to claim 1, comprising a metal reinforcement imbedded in the mass of the body.

5. Molding according to claim 1, comprising at least one flexible lip protruding from the surface of the central portion of the body intended to be turned towards the head of the studs, with the aim of being compressed between the surface and the head of the studs after fitting the molding on the latter.

6. Molding according to claim 2, in which the lips have a hardness at least equal to a SHORE D of 50.

7. Molding according to claim 2, comprising a metal reinforcement embedded in the mass of the body.

8. Molding according to claim 3, comprising a metal reinforcement embedded in the mass of the body.

9. Molding according to claim 4, comprising a metal reinforcement embedded in the mass of the body.

10. Molding according to claim 6, comprises a metal reinforcement is embedded in the mass of the body.

11. Molding according to claim 2, comprising at least one flexible lip protruding from the surface of the central portion of the body intended to be turned towards the head of the studs, with the aim of being compressed between the surface and the heads of the studs after fitting the molding on the latter.

12. Molding according to claim 3, comprising at least one flexible lip protruding from the surface of the central portion of the body intended to be turned towards the head of the studs, with the aim of being compressed between the surface and the heads of the studs after fitting the molding on the latter.

13. Molding according to claim 4, comprising at least one flexible lip protruding from the surface of the central portion of the body intended to be turned towards the head of the studs, with the aim of being compressed between the surface and the heads of the studs after fitting the molding on the latter.

14. Molding according to claim 6, comprising at least one flexible lip protruding from the surface of the central portion of the body intended to be turned towards the head of the studs, with the aim of being compressed between the surface and the heads of the studs after fitting the molding on the latter.

15. Molding according to claim 7, comprising at least one flexible lip protruding from the surface of the central portion of the body intended to be turned towards the head of the studs, with the aim of being compressed between the surface and the heads of the studs after fitting the molding on the latter.

16. Molding according to claim 8, comprising at least one flexible lip protruding from the surface of the central portion of the body intended to be turned towards the head of the studs, with the aim of being compressed between the surface and the heads of the studs after fitting the molding on the latter.

17. Molding according to claim 9, comprising at least one flexible lip protruding from the surface of the central portion of the body intended to be turned towards the head of the studs, with the aim of being compressed between the surface and the heads of the studs after fitting the molding on the latter.

18. Molding according to claim 10, comprising at least one flexible lip protruding from the surface of the central portion of the body intended to be turned towards the head of the studs, with the aim of being compressed between the surface and the heads of the studs after fitting the molding on the latter.

* * * * *